US006249329B1

(12) United States Patent
Dabral et al.

(10) Patent No.: US 6,249,329 B1
(45) Date of Patent: *Jun. 19, 2001

(54) ASSEMBLING AND SEALING LARGE, HERMETIC AND SEMI-HERMETIC H-TILE FLAT PANEL DISPLAY

(75) Inventors: Sanjay Dabral, Milpitas, CA (US); Raymond G. Greene, Ovid, NY (US); John P. Koons, Warrenton, VA (US); Donald P. Seraphim, Vestal; Boris Yost, Ithaca, both of NY (US)

(73) Assignee: Rainbow Displays, Inc., Endicott, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/007,658

(22) Filed: Jan. 15, 1998

Related U.S. Application Data

(63) Continuation of application No. 08/662,618, filed on Jun. 13, 1996, now Pat. No. 5,781,258.

(51) Int. Cl.[7] ................................................ G02F 1/133
(52) U.S. Cl. ................................................................ 349/73
(58) Field of Search ............................................ 349/73, 153

(56) References Cited

U.S. PATENT DOCUMENTS 3,861,783 * 1/1975 Dill et al. ........................... 349/73
5,781,258 * 7/1998 Dabral et al. ...................... 349/73
5,867,236 * 2/1999 Babuka et al. .................... 349/73

* cited by examiner

Primary Examiner—Walter J. Malinowski
(74) Attorney, Agent, or Firm—Salzman & Levy

(57) ABSTRACT

The present invention features flat-panel displays having a mosaic of tiles, and methods of constructing and sealing them. Sealing designs are described to maintain appropriate vacuum levels for FEDs, PFPDs and LCDs. The mosaic of tiles forming a flat-panel display may include subassembly tiles, with each consisting of two, unsealed, substantially parallel plates having a structure positioned between them; these are known as s-tiles. The tiles may be enclosed by a cover plate and backplate. Non-permeable material may be deposited on the cover plate and the backplate, with solderable metal overlaid on the non-permeable material. A metallized, non-permeable spacer/connector is also located between the cover plate and backplate for hermetically sealing the perimeter of the display. A set of electrical-interconnection, metal feed-throughs can also be positioned in the non-permeable spacer/connector. A flat-panel display may also be made up of half-tiles (h-tiles), with each including an individual bottom plate with a structure disposed on them. The mosaic of tiles also has a cover plate that is shared in common with all of the h-tiles. This common cover plate for each type of FPD integrates functions such as masking, screening, color filtering, polarizing and interconnecting. Also provided in the invention is a method for testing the seal of the flat-panel display. A simulated cover plate is attached via a polymeric seal, so that a structure enclosed between the two plates may be evacuated. When a gas is applied around the display seal, its leakage rate is measured, so as to locate the site of defects.

17 Claims, 18 Drawing Sheets

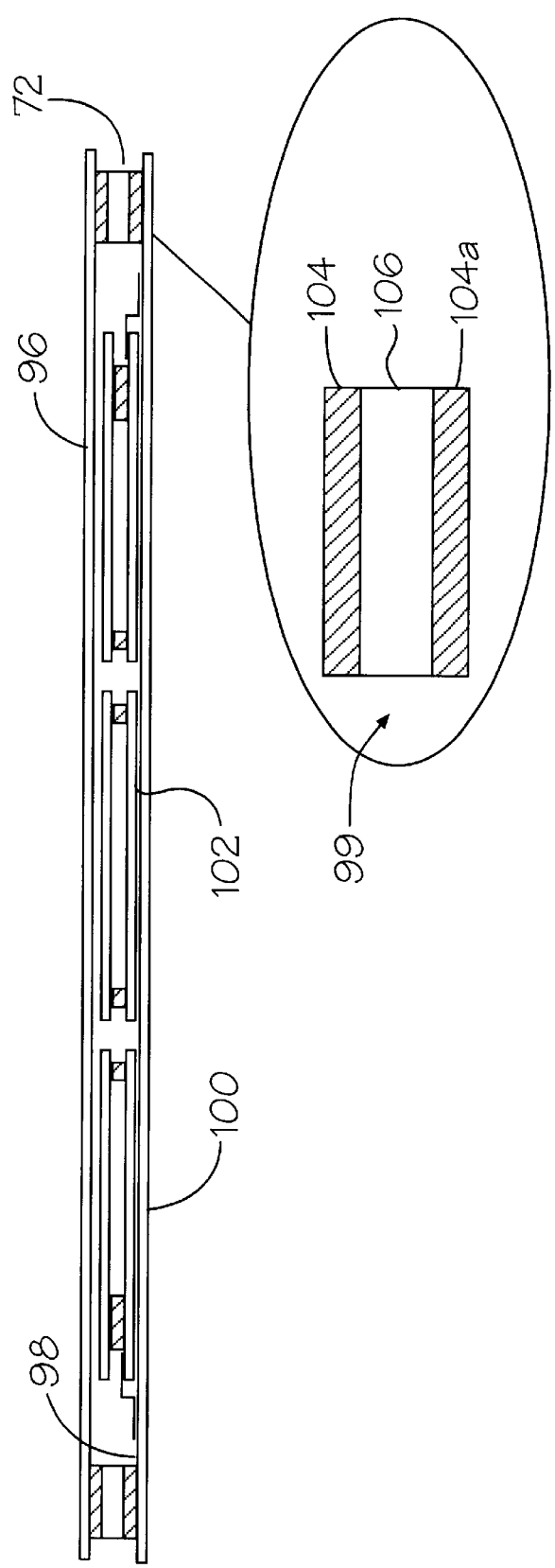

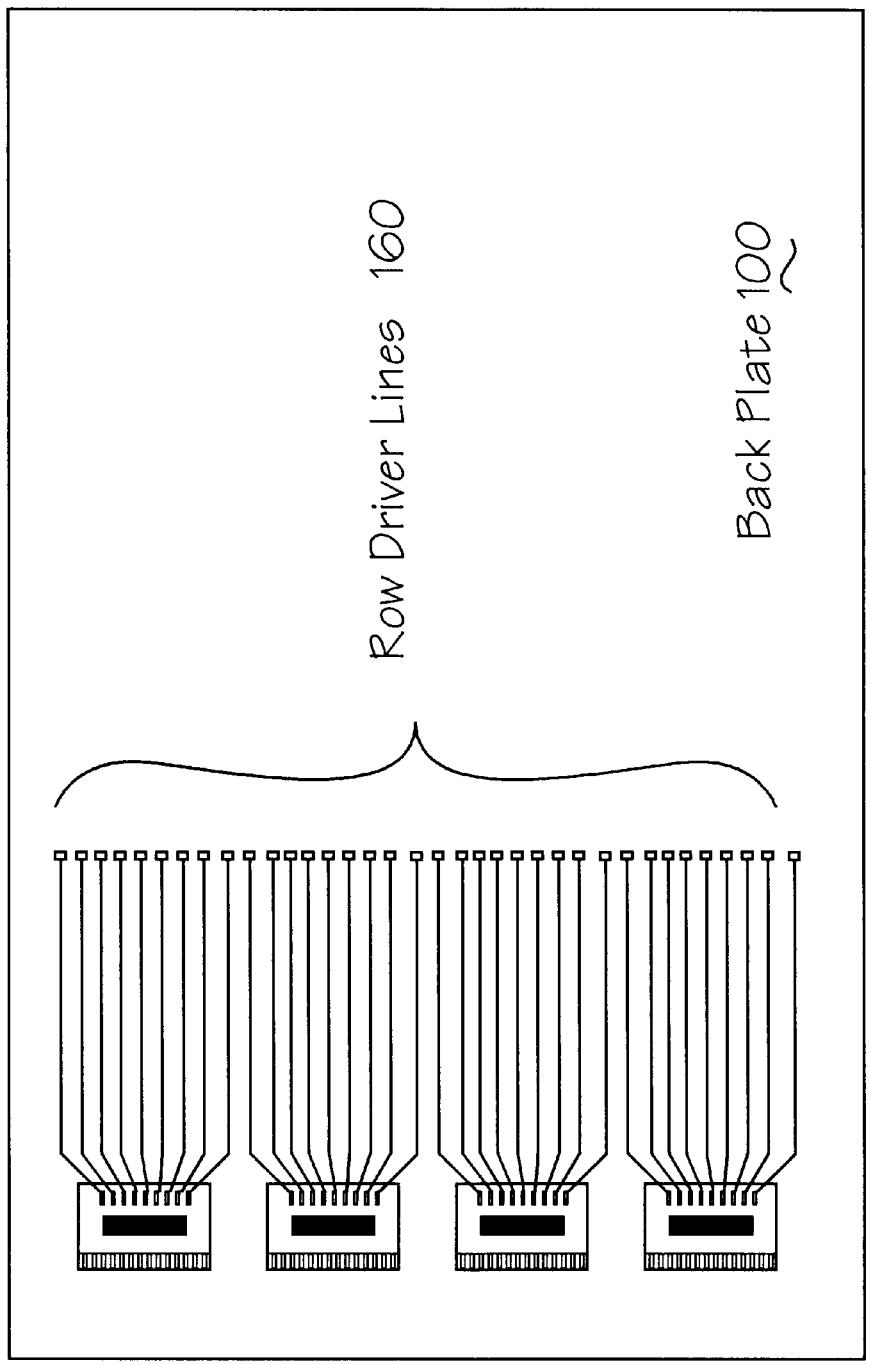

ASSEMBLING AND SEALING LARGE, HERMETIC AND SEMI-HERMETIC H-TILE FLAT PANEL DISPLAY

This is a continuation of patent application Ser. No. 08/662,618, filed Jun. 13, 1996, now U.S. Pat. No. 5,781, 258.

FIELD OF THE INVENTION

The invention pertains to flat-panel displays (FPDs) and, more particularly, to assembling and sealing large FPDs from a plurality of smaller FPDs (tiles) by using either partial, FPD subassemblies (h-tiles), or unsealed, FPD subassemblies (s-tiles).

BACKGROUND OF THE INVENTION

FPD tiles generally consist of a structure that is disposed between and includes two parallel glass plates. Tiled FPDs are formed from a plurality of tiles that are sandwiched between a cover plate and a backplate. Tiling has been discussed in detail in the previous patent applications bearing Ser. No. 08/571,208, 08/593,759, and 08/652,032, all of which are hereby incorporated by reference; most examples therein reference active-matrix, liquid-crystal display (AMLCD) designs, although many of the concepts and claims are applicable to super twisted nematic LCDs (STNLCDs) and other FPD technologies, e.g., field-emission displays (FEDs), plasmna flat-panel displays (PFPDs) and electroluminescent displays (ELDs).

Two types of tile subassemblies are considered in the instant application. The first type employs only the bottom substrate of an FPD tile. In this design, the cover plate of the mosaic becomes a common, top plate which includes elements to provide functions for all of the tile subassemblies, i.e., masks, screens, electrodes, phosphors, color filters and polarizers. This type of subassembly is called a half-tile or an "h-tile". H-tiles use only one plate; the usual functions of the second plate are performed on a cover plate that is common to the plurality of h-tiles. The second type of subassembly, called an "s-tile", uses an essentially complete, small FPD, but it has no seal. In other words, s-tiles are similar to fully-formed tiles, except that they are not sealed at this level of assembly.

In tiled FPDs, a seam is disposed between the boundaries of adjacent tiles, s-tiles or h-tiles. A design-and-assembly technique is generally used that will provide for the manufacture of large displays from a plurality of tiles, including s-tiles or h-tiles, with seams at the boundaries thereof that are not visible to the human eye under intended viewing conditions. A level of hermeticity is used for the AMLCD that is sufficient to inhibit the degradation of the liquid-crystal material. A higher level of hermeticity for PFPDs is necessary, in order to maintain the purity of the inert gas supporting the plasma. An even higher level of vacuum is employed for FEDs, in order to preclude contamination of emitter-electrodes.

Co-pending U.S. patent applications, Ser. Nos. 08/571, 208 and 08/593,759 (filed Dec. 12, 1995, and Jan. 29, 1996, respectively), teach methods for fabricating and sealing tiled, active-matrix, liquid-crystal displays in FPD formats, while maintaining optically imperceptible seamlessness between abutting tiles. Although the teachings of these patent applications may also be applied to other FPD designs (e.g., FEDs, PFPDs, ELDs), due to their nature, various other designs and manufacturing techniques are also feasible, as discussed hereinbelow.

In the case of both FEDs and some PFPD designs, light is emitted from the phosphor that is near the top of the optical stack, so that there are fewer reflections from the side walls of these tiled FEDS and PFPDs than there are in AMLCDs, which are back-lighted. Moreover, the high focal-point in the optical stack makes the view angle superior, when compared with other displays which lack special designs to correct such deficiencies. Because of these superior, optical-design factors, it is expected that tiling designs with FEDs will meet the requirements for seamlessness much more easily than other, alternative, FPD technologies. For example, since the lighting efficiency of FEDs may be quite high, substantial masking can be used in both the seam and the pixel perimeter areas, and a screen to counteract reflections from the seams.

A common problem in the manufacture of large FPDs is the relatively low yield therefrom. Yield has been found to be approximately inversely proportional to the FPD area. It is often preferable, therefore, to construct a large FPD from many small ones, known to be good by appropriate inspection and testing.

On the other hand, the number of required connections increases in proportion to the number of tiles. Thus, assembly and interconnection costs accumulate proportionally to the number of tiles. Furthermore, the probability of a defect in the plurality of tiles integrated into an FPD increases with the number of interconnections made. Therefore, it is important to be able to test and ensure that "known good tiles" are used in the assembly of the FPD. It is also important that there be an economical method of reworking connections to the tiles. For the latter reason alone, it is desirable to assemble s-tiles with their own phosphor screens in proper registration, testing them prior to joining them to the interconnection on a backplate and then sealing them with a cover plate.

Another concern is the problem of committing a large number of tiles to an FPD and then finding the seal to be defective. It would be advantageous to isolate the problems of vacuum integrity and interconnection, and solve them independently.

SUMMARY OF THE INVENTION

In accordance with the present invention, there are provided methods of constructing and sealing s-tiled and h-tiled, flat-panel displays. Sealing designs are described to maintain appropriate vacuum levels for field-emission displays (FEDs), plasma flat-panel displays (PFPDs) and liquid-crystal displays (LCDs). The mosaic of tiles forming a flat-panel display may include subassembly tiles, with each consisting of two, unsealed, substantially parallel plates having a structure disposed between them; these are known as s-tiles. The s-tiles are arranged on a backplate and a cover plate. Non-permeable material may be deposited on each of the two plates, with solderable metal overlaid on the non-permeable material. A metallized, non-permeable spacer/connector is also disposed between the backplate and cover plate for hermetically sealing the perimeter of the display which encloses the array of s-tiles. A set of electrical-interconnection, metal feed-throughs can also be disposed in the non-permeable spacer/connector.

A flat-panel display may also be made up of half-tiles (h-tiles), each including an individual bottom plate, and wherein the mosaic of tiles also has a cover plate that is shared in common with all of the h-tiles. The outer seal may be disposed as described above for s-tiles. This common cover plate integrates functions such as masking, screening, color filtering, polarizing and interconnecting. Also provided in accordance with the invention is a method for testing the seal of the flat-panel display. A simulated cover plate is attached by means of a polymeric seal, so that a structure enclosed between the two plates may be evacuated. When a gas is applied around the display seal, its leakage rate is measured, so as to locate the site of defects.

BRIEF DESCRIPTION OF THE DRAWINGS

A complete understanding of the present invention may be obtained by reference to the accompanying drawings, when taken in conjunction with the subsequent, detailed description, in which:

FIG. 14 shows an s-tiled FPD having seals;

FIG. 18 is a schematic view of wiring disposed on a tile back plate.

DETAILED DESCRIPTION OF THE PREFERRED EMBODIMENT

Flat-panel displays (FPDs) are generally designed with two glass plates or substrates that are spaced apart by physical spacers (e.g., glass beads of a predetermined size). In some configurations of field-emission displays (FEDs) and plasma flat-panel displays (PFPDs), the spacing maintains an anode-and-cathode relationship with controlled electrical field properties. In some FPD configurations, the electrodes are located on the lower glass substrate, with the upper glass substrate functioning as a phosphor-coated screen.

Figure 1:
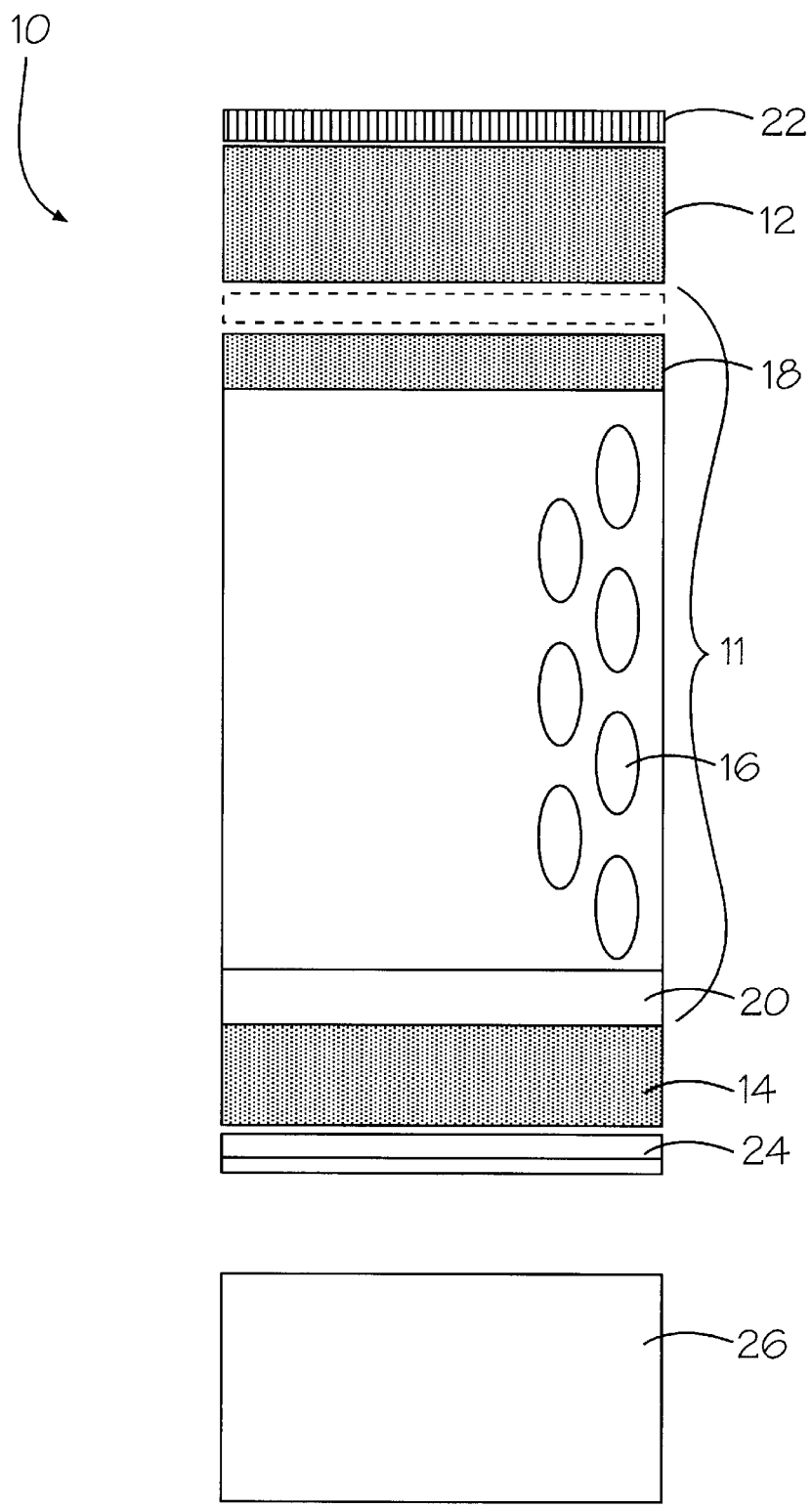
FIG. 1 shows the general configuration of an active-matrix, liquid-crystal display (AMLCD)

Referring now to FIG. 1, there is shown a typical, AMLCD arrangement 10. The volume 11 between the substrates or plates 12 and 14 is evacuated to a range of between $10^{-1}$ torr to $10^{-2}$ torr, and then filled with liquid-crystal material 16. The liquid crystal 16 rotates the polarization of light passing through it, as a function of the magnitude of the electrical field between the top electrode 18 and bottom electrode 20 at each sub-pixel (usually one of a set of primary colors, such as red, green and blue). This modulates the transmission of light, not shown, through (usually crossed) polarizers 22 and 24 with liquid crystal 16 therebetween. A thin-film transistor (TFT) 20 and capacitive components, not shown, disposed at each sub-pixel, respectively write and hold the required voltage across the electrodes 18 and 20. The general AMLCD arrangement 10 includes a light source 26 that is usually external to and below the structure 10.

Figure 1A:
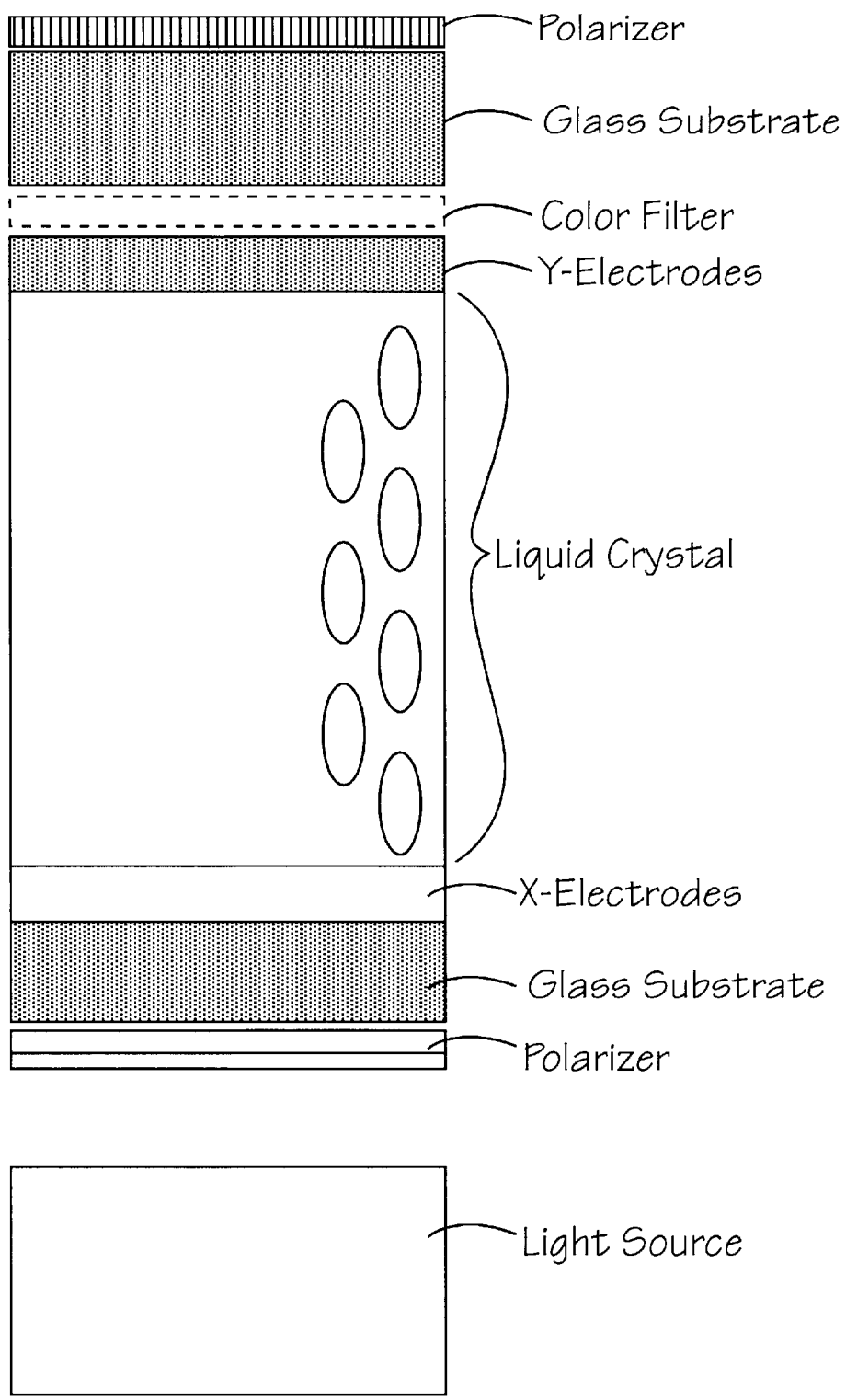
FIG. 1a shows a super-twisted, nematic, liquid-crystal display (STNLCD) construction.

FIG. 1a shows a super-twisted, nematic, liquid-crystal display (STNLCD) construction. In an STNLCD, pixels are selected at the intersection of X-electrodes on the bottom plate and Y-electrodes on the top plate.

Figure 2:
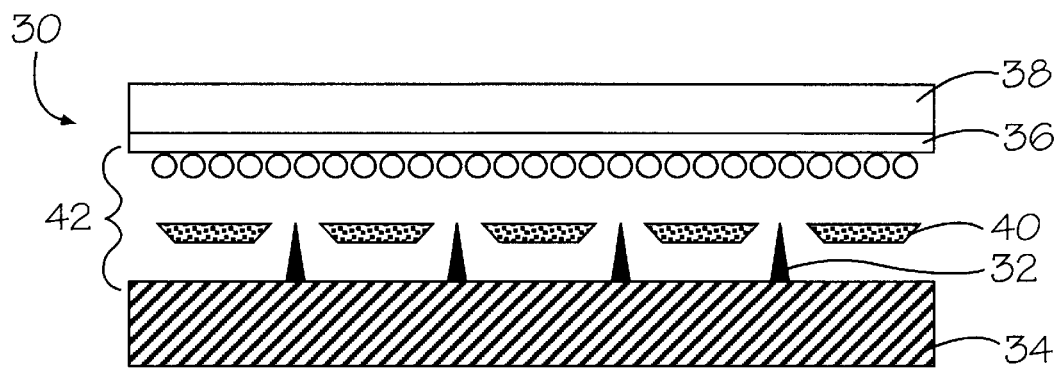
FIG. 2 shows the general configuration of a field-emission display (FED)

Referring now to FIG. 2, in the case of an FED 30, a triode relationship is maintained with emitters 32 on the bottom substrate 34 and a phosphor-coated anodic screen (ITO) 36 on the top substrate 38. A grid structure 40, located above the emitters 32 and insulated therefrom, applies an electrical-field potential to the appropriate cathode (emitter) 32. The space 42 between the substrates 34 and 38 is a vacuum in the range of $10^{-8}$ to $10^{-9}$ torr. This level of vacuum is needed to preclude emitter degradation over the life of the FPD.

Figure 3:
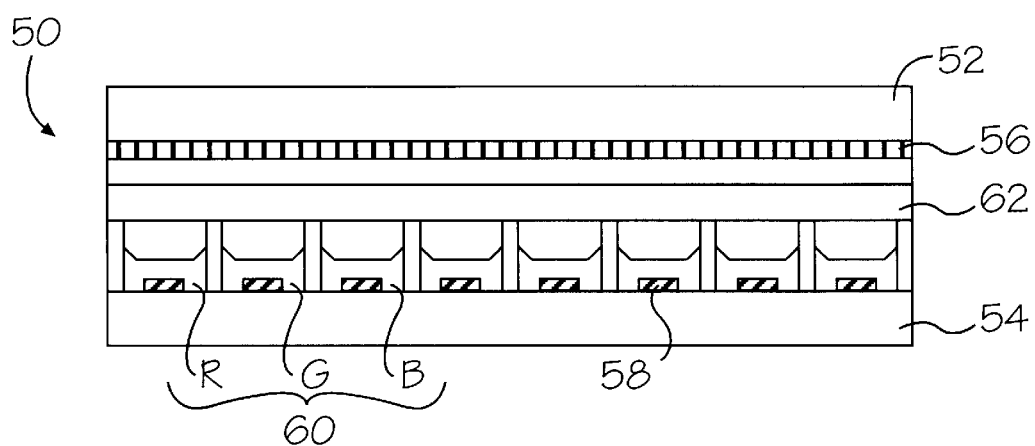
FIG. 3 shows the general configuration of a plasma flat-panel display (PFPD)

Referring now to FIG. 3, there is shown the general arrangement in a PFPD design 50. Electrodes 56 and 58, respectively, are on the top substrate 52 and bottom substrate 54; they are orthogonal, and are used to select the pixel to be activated.

Figure 4:
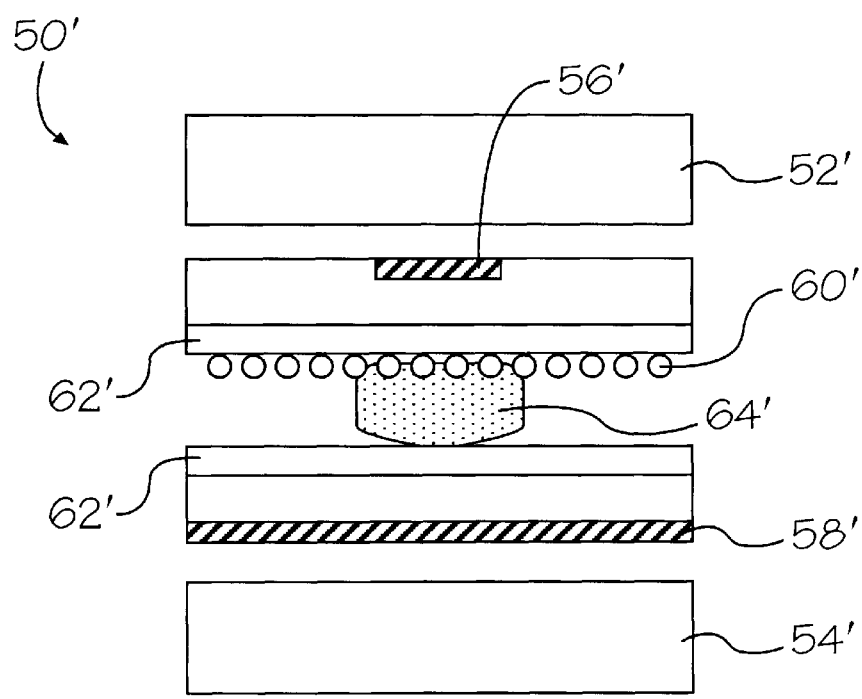
FIG. 4 shows the general configuration of an opposed-discharge PFPD.
Figure 5:
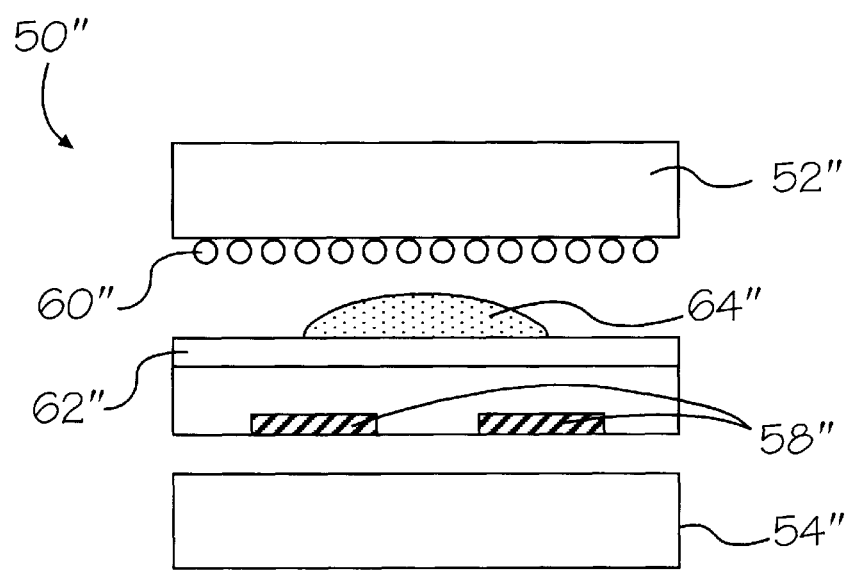
FIG. 5 shows the general configuration of a surface-discharge PFPD.

Alternative PFPD configurations 50' and 50" are shown, respectively, in FIGS. 4 and 5. FIG. 4 shows an opposed-discharge type 50', again with orthogonal top and bottom electrodes 56' and 58', but with a different phosphor-screen design 60'. As can be seen from FIG. 5, the top plate is quite simple for the surface-discharge type of PFPD construction 50". This design lends itself most handily to an h-tiled approach, because electrical functions are mostly contained on the bottom substrate 54. In the case of PFPDs, the space between the substrates is evacuated in the range of between $10^{-3}$ torr to $10^{-4}$ torr, and is then filled with an inert gas.

In the case of FEDs and PFPDs (as opposed to LCDs), light is generated internally via the activation of photons in the red, green and blue phosphors 60, 60' and 60". The generation mechanism in the FEDs is a strong electrical field acting on electron-emitter-materials 62, 62' and 62" via an anodic grid, not shown. The electrons pass through the emitters 62, 62' and 62" and are collected in the color phosphors 60, 60' and 60" on conductive, anodic, transparent layers 52, 52' and 52". The generation mechanism in PFPDs 50, 50' and 50" is an electrical-field activation of gaseous plasmas 64' and 64", generating both positive ions and electrons, which release ultraviolet energy, which, in turn, activates the phosphors 60' and 60".

Since LCDs, FEDs and PFPDs require different vacuums, they each have different sealing requirements at their perimeters. If the FPD is made up of a mosaic of tiles, the designs are affected substantially by their respective sealing requirements. For example, the geometry of electrical connections to the mosaic must be accommodated without destroying the effectiveness of the seal.

Figure 6:
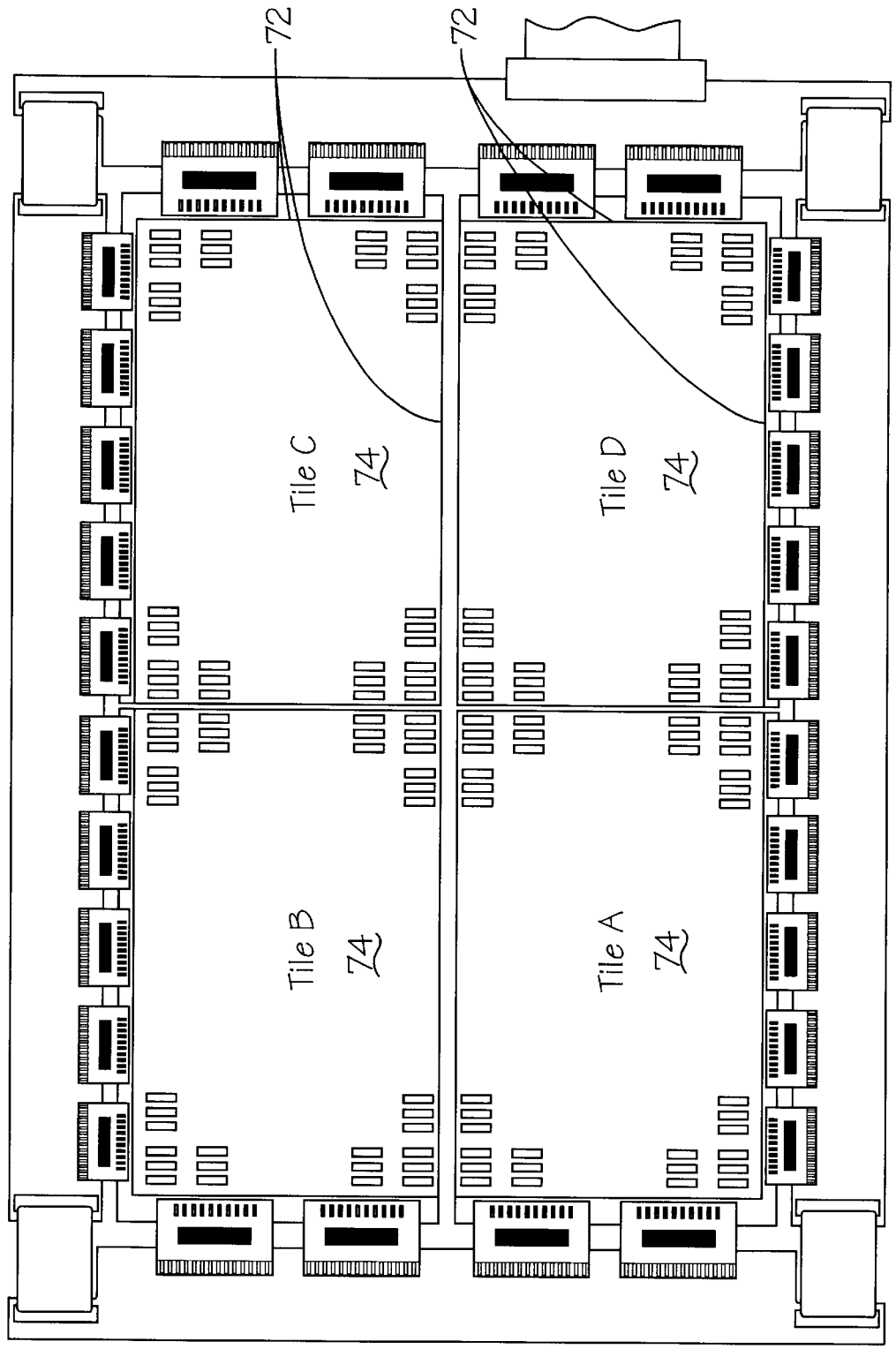
FIG. 6 is a top view of a tiled AMLCD.
Figure 7:
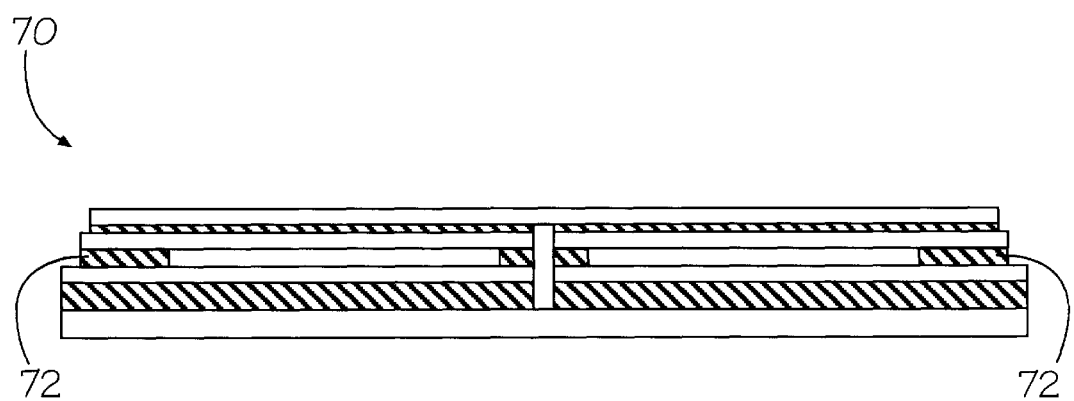
FIG. 7 shows a side, sectional view of the tiled AMLCD shown in FIG. 6.

Tiled AMLCDs have been extensively described in co-pending U.S. patent applications, bearing Ser. Nos. 08/618,046; 08/593,759; 08/628,308; 08/636,604; 08/652,032; 08/571,208; and 08/652,032. FIG. 6 shows the top view of a tiled AMLCD 70. FIG. 7 shows a side view of the AMLCD 70 shown in FIG. 6.

Figure 6A:
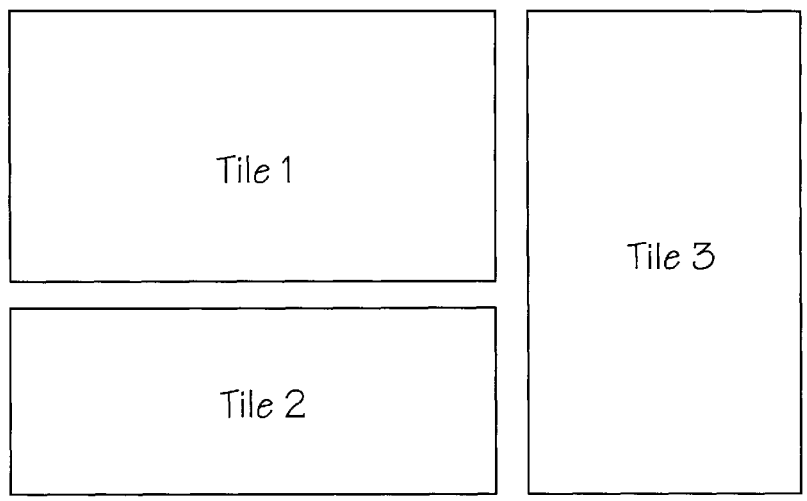
FIG. 6a is a top view of a non-array, tiled, flat-panel display (FPD)

Tiled, h-tiled and s-tiled FPDs, although always formed with a plurality of tiles, need not be constructed in an N×N or even in an N×M array, nor need they be constructed of tiles of the same size or shape. FIG. 6a shows a three-tile FPD, for example, having tiles of different sizes. Other configurations can also be used.

In the case of AMLCDs, the liquid-crystal material 16 (FIG. 1) is constrained between transparent plates 12 and 14 (FIG. 1). Therefore, the two plates 12 and 14 (FIG. 1) are generally sealed at the perimeter 72 of the display. It is also convenient, of course, to incorporate fully functional, known-good FPD tiles 74.

Figure 8:
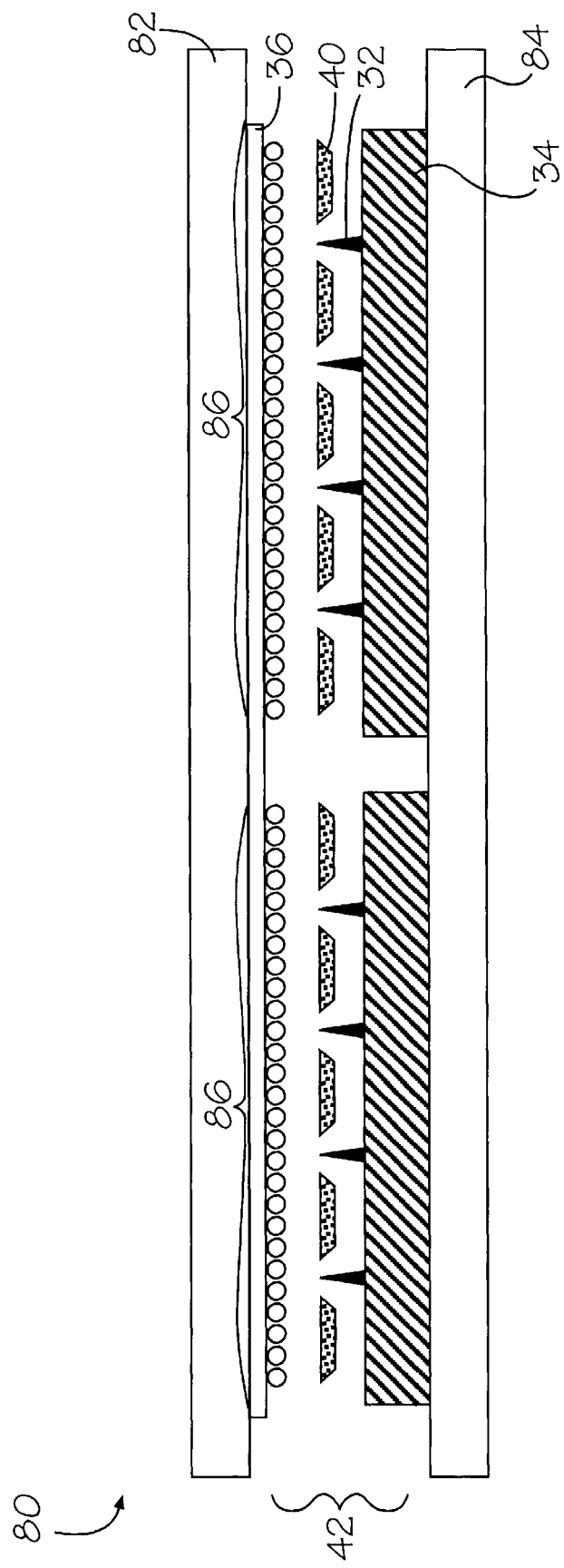
FIG. 8 shows an h-tiled FED.

Referring now to FIG. 8, a side view of an h-tiled FED 80 is shown. The FED construction 30 shown in FIG. 2 is also utilized in FIG. 8.

For the h-tiled design, h-tiles 86 are aligned with the backplate 84. Perimeter interconnections, not shown, join h-tiles 86 to the backplate 84. In a 2×2 array, not shown, the backplate 84 has circuitization only where needed for contact points to the h-tiles 86 and for an exit through the FPD perimeter seal, not shown. For a 2×N array, with N>2, not shown, interconnection circuitization, not shown, is needed on the backplate 84, in order to reach the edges of the internal h-tiles 86.

Figure 16:
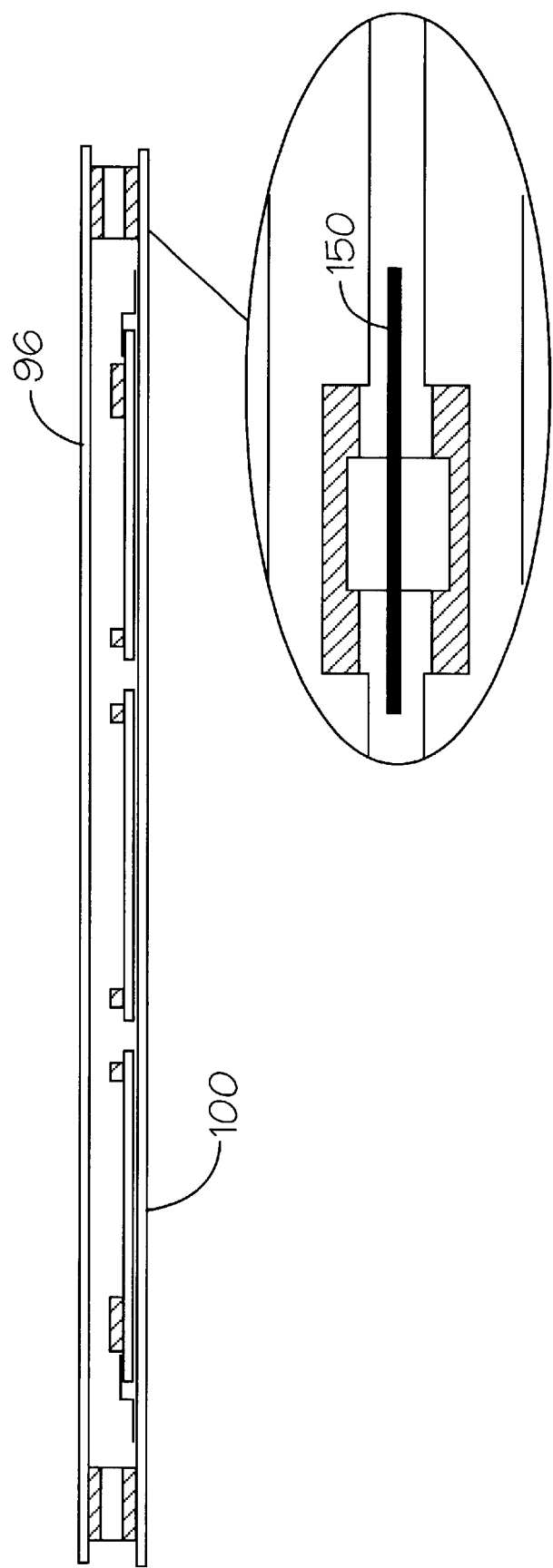
FIG. 16 shows an alternative sealing design with integrated feed-throughs.

A known-good, vacuum-tight connector block, (a composite of the non-permeable spacer 106 and feed-throughs 150 in FIG. 16), with glass to metal seals, is an important component in the design of FEDs. Preferably, such connector blocks are made independently, with a desirable number of interconnections made simultaneously, tested for seal integrity, and later integrated as a block into the design of an FPD.

One possible sequence of construction is to sputter or vacuum-evaporate thin-film interconnections on a glass block, using metallurgy with a CTE (coefficient of thermal expansion) that is substantially similar to the glass. An Invar™-or Kovar™-type alloy may be adequate for this application. A glass frit is then applied over the interconnection, with a block of glass used to cover the frit. This combination is sintered together under sufficient pressure to form a sealed connector block. Thin-film metallurgy that is wettable by solder is applied around the block, wherever the final seals are to be made. Open ledges in the side of the block expose the thin films for possible, later bonding interconnections. The metallurgy on the ledges may be optimized for soldering or wire-bonding processes.

The seal between the cover plate 96 and the backplate 100 is processed and tested, prior to joining other h-tiles. To accomplish a test, a simulated cover plate having a pliant, polymeric seal (o-ring-like) is attached to the backplate and frame, so that the volume enclosed by the two plates and frame may be evacuated. A helium leak-detector (attached to the simulated top plate) and an ion gauge are used to measure the leakage rate of helium, which diffuses quite rapidly through pores and cracks. Helium is applied selectively around the seal with a hollow needle, in order to locate any sites of defects. This process is capable of detecting the predominant number of defects created during sealing.

In a concurrent step, the h-tiles 86 are tested independently, and good ones selected. Any apparatus similar to the above combination of simulated cover plate 82 and interconnected, sealed backplate 84 can be used to accomplish the same functions.

The known-good h-tiles 86 are then permanently joined to an interconnected backplate 84 in arrays of 2×2, 2×N, N×N, or even N×M, as previously described in patent applications bearing Ser. Nos. 08/571,208 and 08/652,032. The simulated cover plates 82 are sealed both to the backplate 84 and the glass frame, not shown; the assembly 80 is then evacuated. This allows a complete test of the FPD assembly 80, prior to final sealing and yet at a stage where certain rework may still be accomplished, if necessary.

Figure 9:
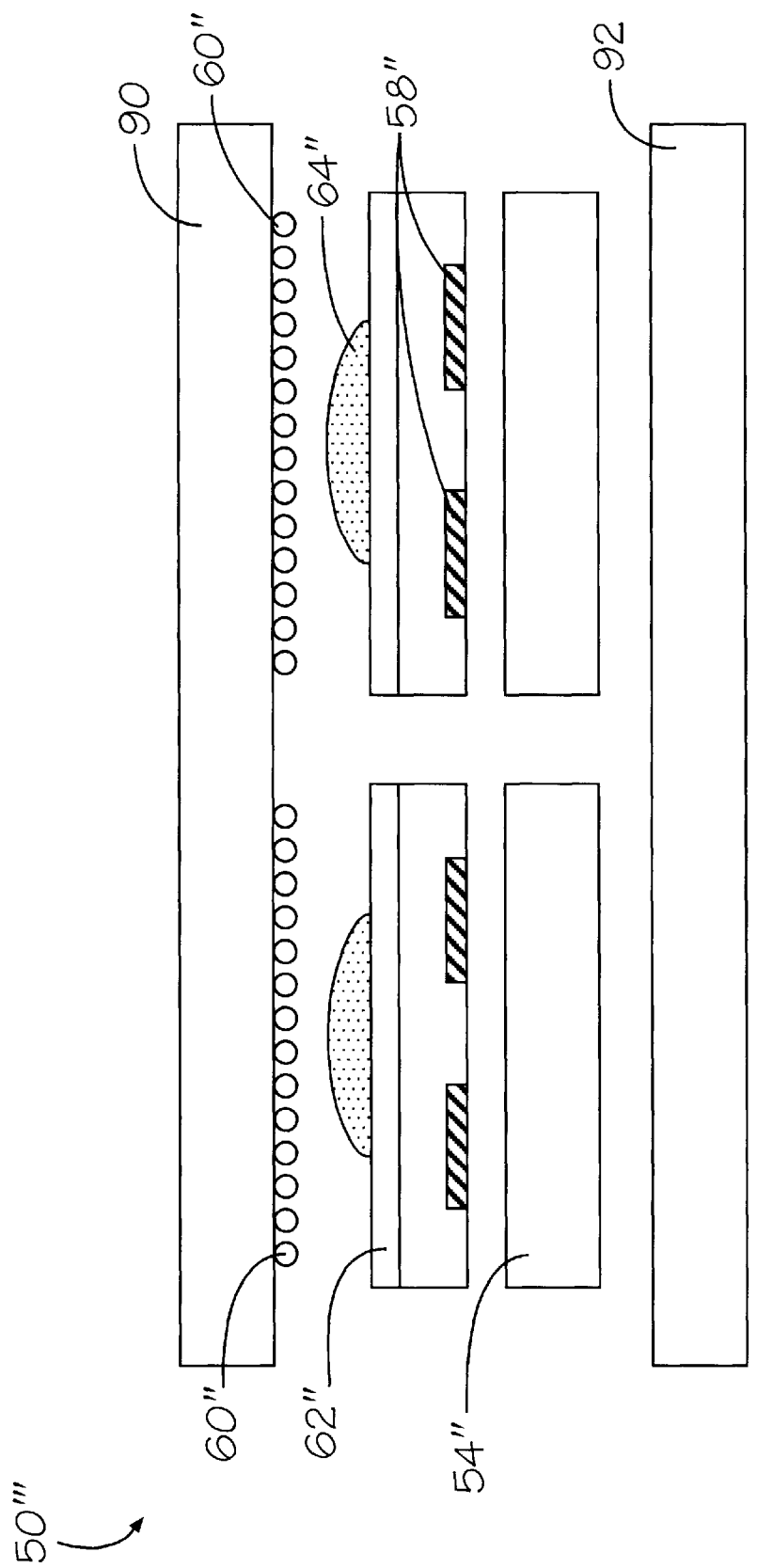
FIG. 9 shows an h-tiled PFPD.

Referring now also to FIG. 9, there is shown a cross-section of an h-tile PFPD. When the tested FPD is good at this stage, a cover plate 90 is permanently sealed to the assembly 50'''. The second seal is a mechanically-forgiving, ductile, metal seal, such as solder, which will be described hereinafter. The permanent, vacuum capability of the two permanent seals is then testable, as described above. Defects in the seal at this stage are thus located and reparable, via a local-melting, using a laser beam or other technology well known in the art, not shown.

In view of the importance of maintaining a high vacuum for achieving long-term reliability of FEDs, a bake-out sequence is recommended at various stages of the above described process. For additional assurance, a vacuum device 101 (FIG. 13), such as an ion pump or a flashable getter, for example, may be permanently attached to the cover plate 90 assembly. Since such vacuum devices 101 may also function as a gauge, the FED inventory may be tested for vacuum quality at any time. The pump may be periodically activated to enhance the vacuum, if the vacuum registers above a desired torr value.

A great number of interconnection lines such as tile-to-flex connections 75 (FIG. 6) are often necessary at the perimeter 72 of the display; these lines are difficult to seal. Because sealing is the most difficult process, and because it requires substantial space in proportion to pixel pitch, it is desirable to place seals in the outer perimeter 72 of the display, where they are hidden.

The construction of the cover plate 90 can remain similar to a monolithic FPD of the same design. The vacuum requirement is difficult to meet, since interconnections enter the tiles 74. The cost of sealing increases in proportion to the number of perimeters 72 to be sealed. Since two seals (one on each neighboring tile's perimeter) make up a large part of the dimensions between pixels on neighboring tiles 74, it is preferable to have one secure, outer seal, not shown, rather than the same number of seals as tiles.

Similar construction techniques may be used for an FPD made from a plurality of PFPD h-tiles, as shown in FIG. 9. The surface-discharge type of PFPD (shown in FIG. 5) is ideally suited for h-tile construction, because many electrical functions can be contained in the h-tile, with the common cover plate required to function only as the phosphor-coated screen and the achievement of the external seal.

Figure 10:
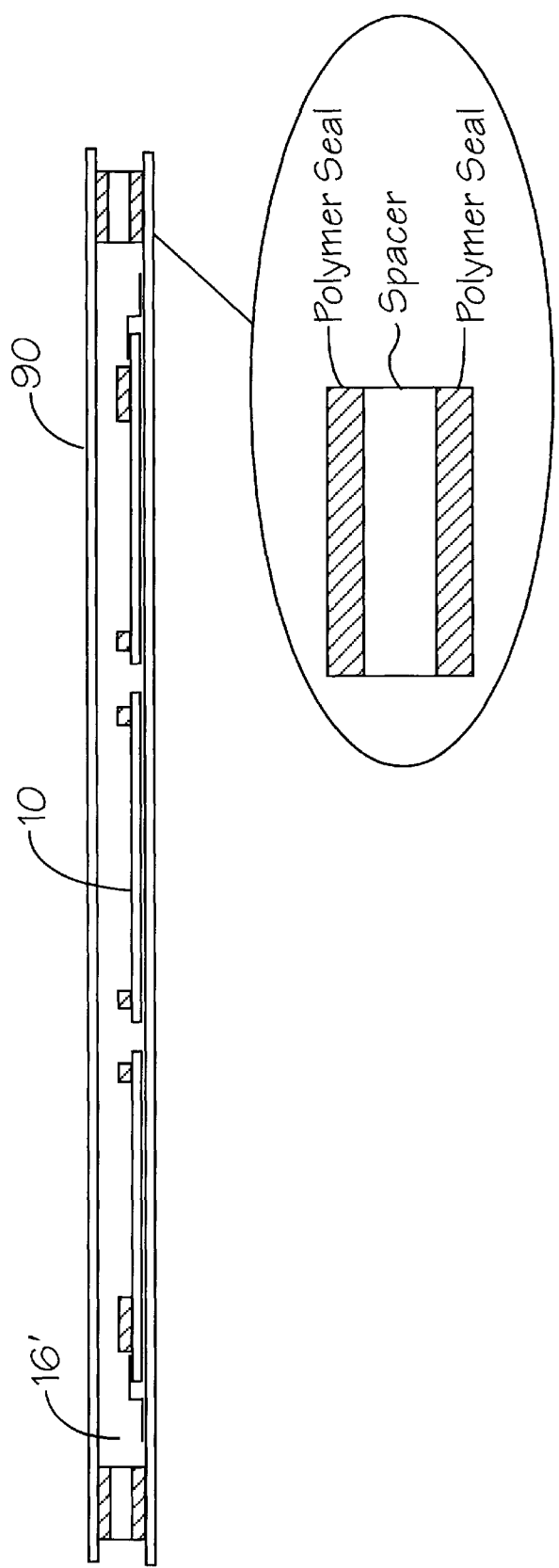
FIG. 10 shows an h-tiled AMLCD.
Figure 15:
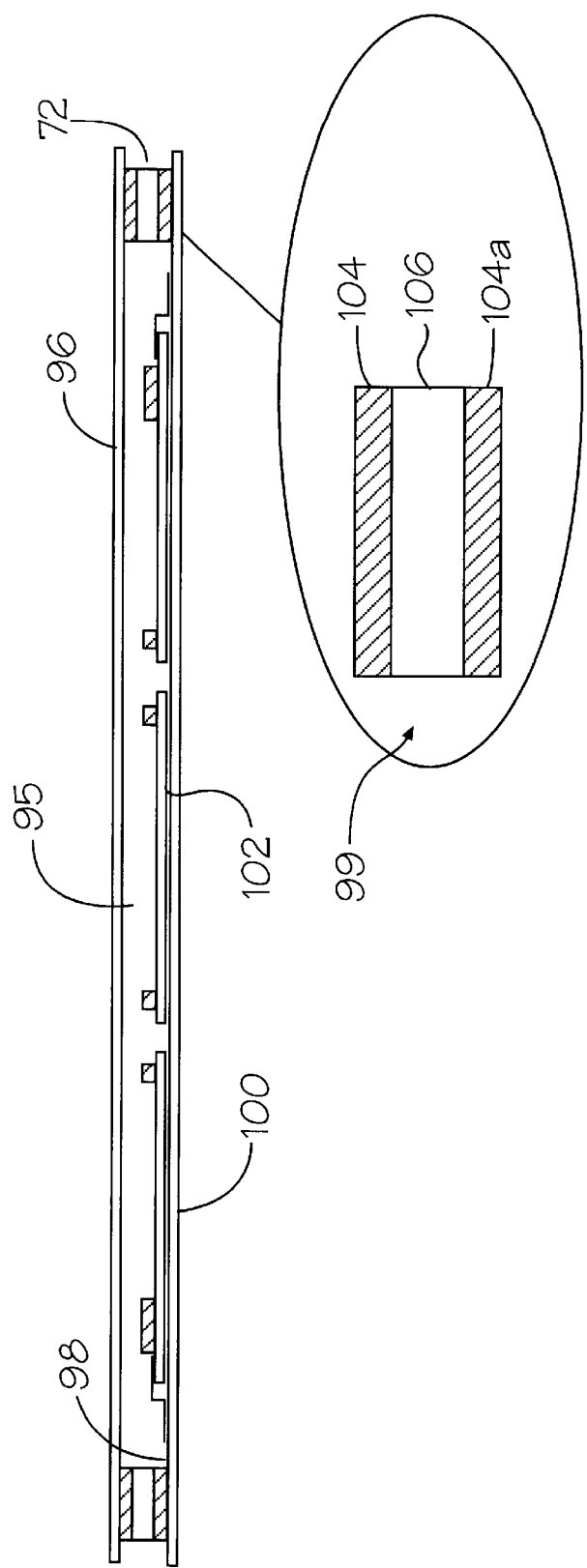
FIG. 15 shows an h-tiled FPD having seals.

Similar construction techniques may also be used for an FPD made from a plurality of LCD h-tiles, as shown in FIG. 10. At the FPD level of assembly, liquid-crystal material 16' may be introduced in the volume between the cover plate 90 and the h-tiles 10 on the back plate. The liquid-crystal material may be introduced through symmetrically-located ports, not shown, as described in patent application, Ser. No. 08/652,032. The entire FPD may be completely sealed as shown in FIG. 15.

There are important elements of commonality in the cover plate designs of FPDs made with h-tile arrays. These elements and their preferable, sequential arrangements in the optical path(s) are dependent upon the specific type of FPD. For example, in an LCD, the common cover plate for the mosaic of h-tiles may contain a color filter, a polarizer, a mask and a screen in the order noted. On the other hand, for an STNLCD, the interconnection for the column drivers may be on the cover plate as well, while the row drivers are on the h-tiles. Alternatively, the row drivers may be on the cover plate, and the column drivers on the h-tiles. Each tile may also be treated as a single, electronic entity by the color-and intensity-matching circuits. Finally, the liquid-crystal material fills the entire FPD container as a common element.

The cover plate for the FED h-tiles has a common collector-electrode, phosphor screen and mask. The high vacuum is common for all of the FPD h-tiles.

In the case of the h-tiled PFPD, the cover plate may be similar to that for the FED, having a common collector, a mask and phosphor. The gas environment is also common to all tiles.

In both s-tile and h-tile arrays, this common-environment element may have significance in establishing optical continuity from tile to tile.

Figure 11:
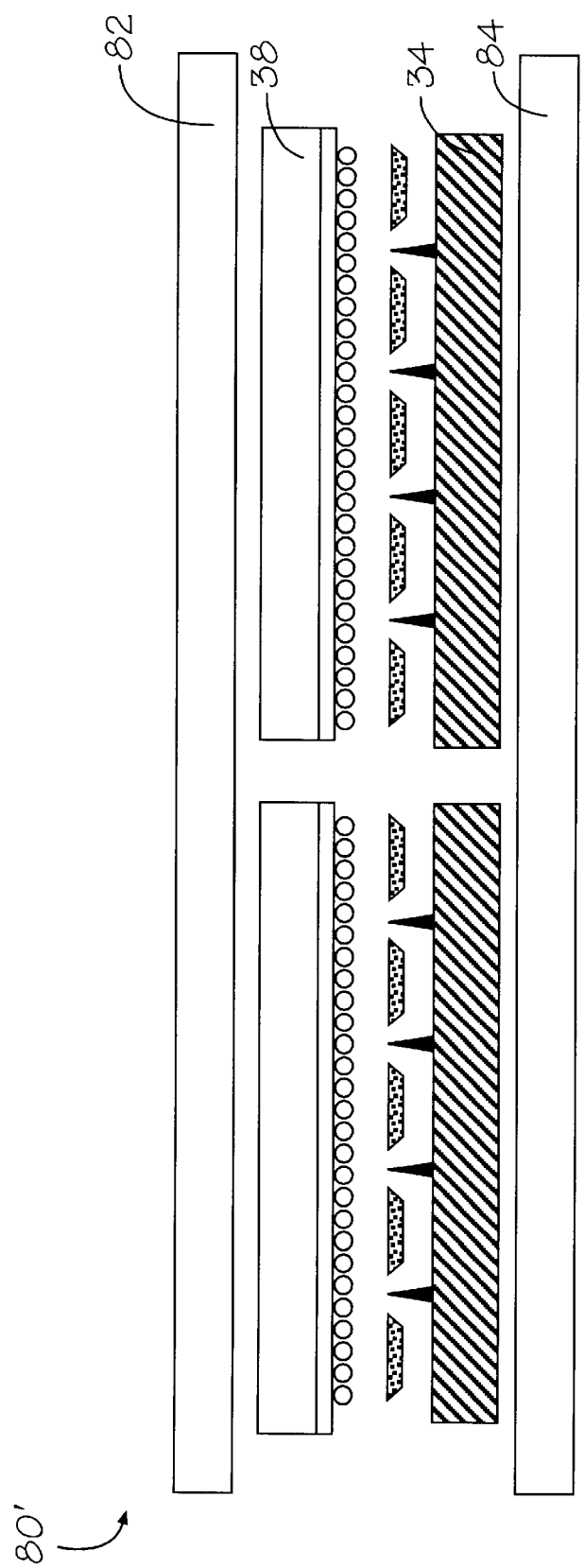
FIG. 11 shows an s-tiled FED.

FIG. 11 shows the side view of an s-tiled FED 80'. Using unsealed tiles, an s-tile approach can be used.

Figure 12:
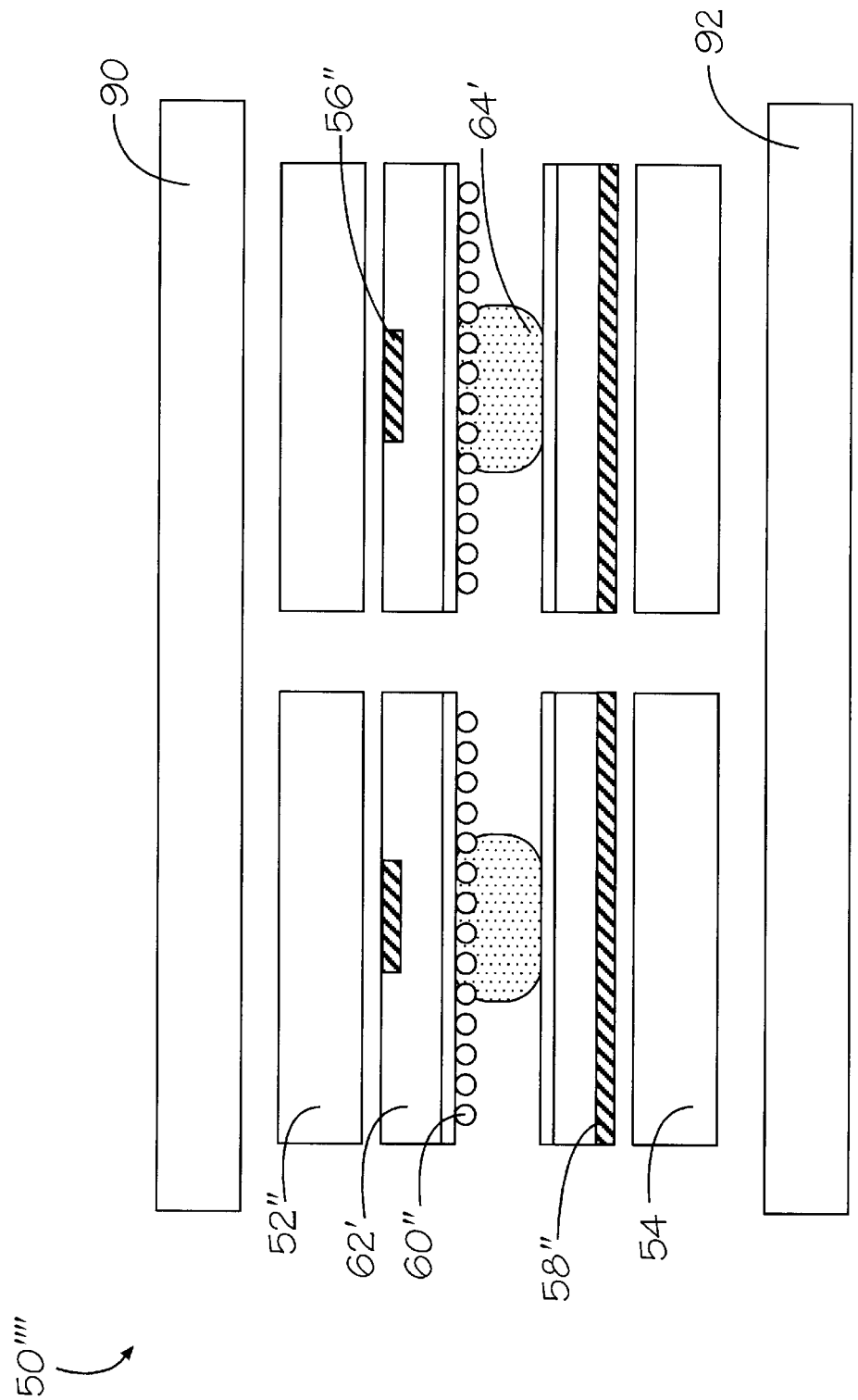
FIG. 12 shows an s-tiled PFPD.
Figure 13:
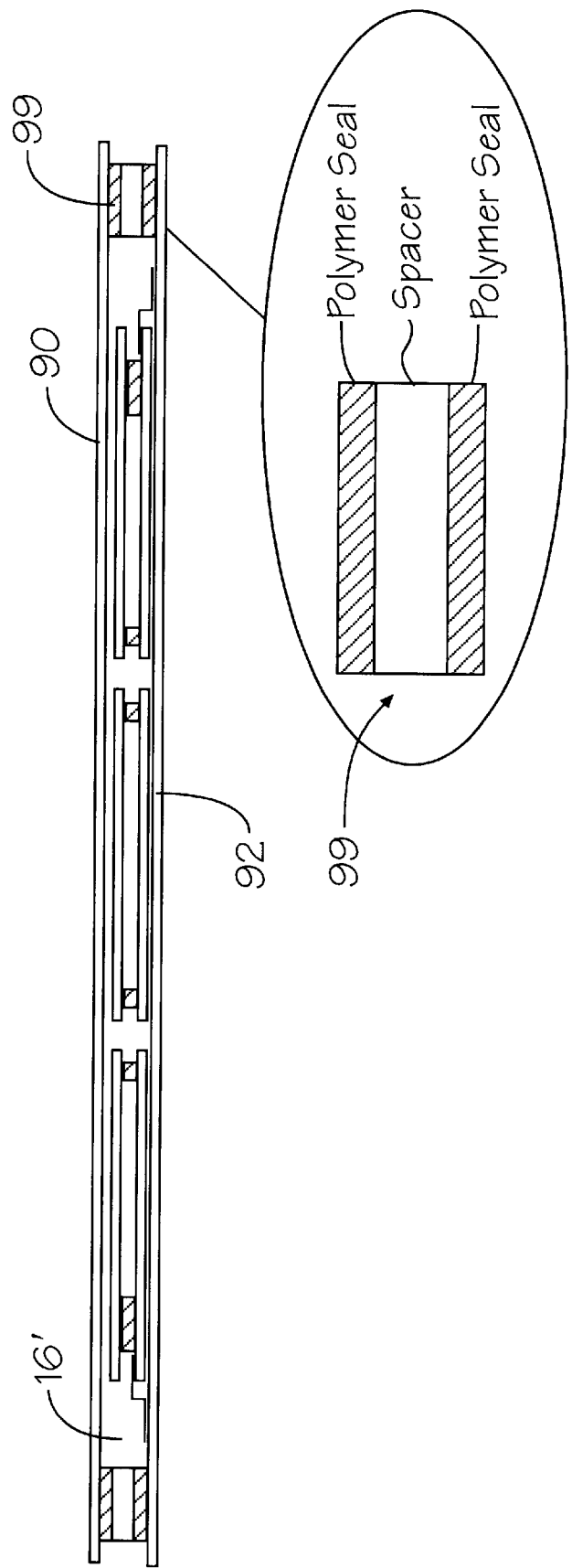
FIG. 13 shows an s-tiled AMLCD.
Figure 13A:
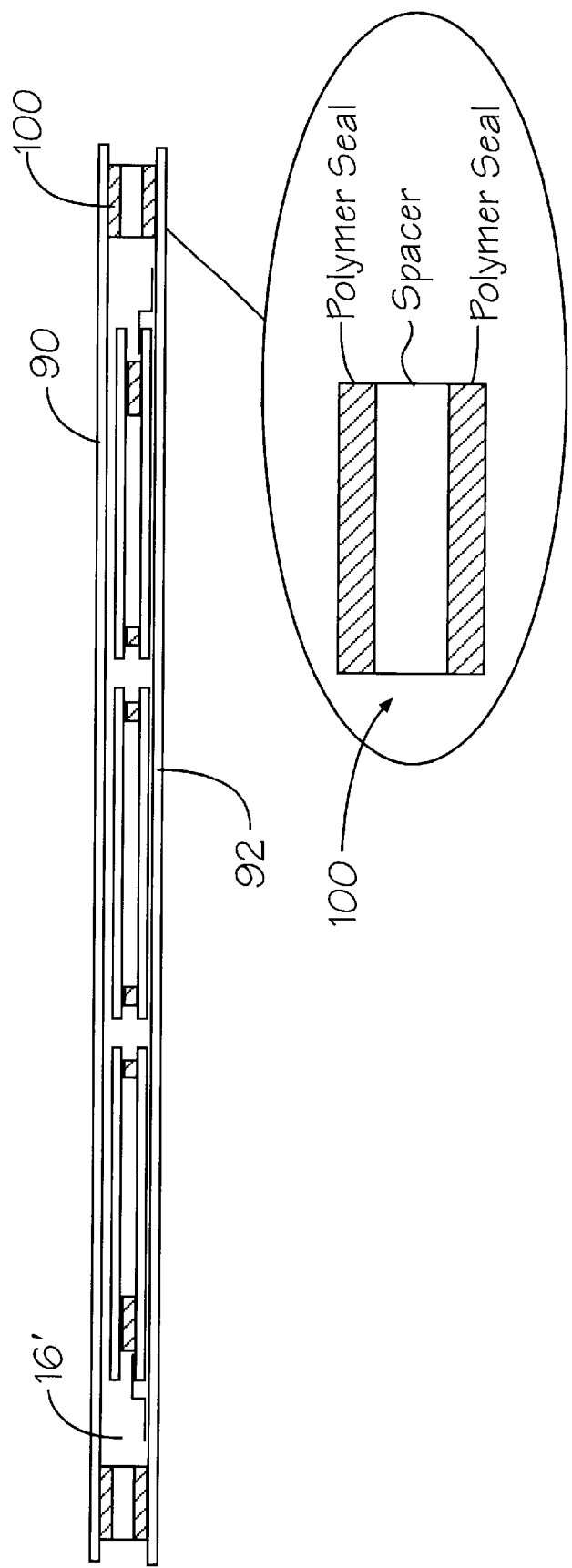
FIG. 13a shows an s-tiled STNLCD.

FIG. 12 is a side view of an s-tiled, PFPD, opposed-discharge configuration 50". This opposed-discharge configuration of the PFPD may lend itself more suitably to the s-tiled approach, because the upper electrodes 56" and other details have a level of complexity which would reduce yield, if integrated into the cover plate 90. For the same reason, the PFPD configuration (FIG. 3) itself also may be more suitable for an s-tile approach. FIG. 13 shows an s-tiled AMLCD. FIG. 13a shows an s-tiled STNLCD.

For s-tiles, it is convenient to register top plates 52" and bottom plates 54 together, forming a testable unit with driver lines attached. Uniform spacing of top to bottom plates 52" and 54 may be achieved by using glass spheres or alternative spacers of a desired radius. For h-tiles, the spacing may be achieved by using an approach that is similar to that described in co-pending patent application, Ser. No. 08/652, 032. The method described therein employs a compliant spacer 99 between the h-tiles and the backplates, as well as non-compliant spacers, not shown.

The disadvantage of using s-tiles (as opposed to h-tiles) is the extra layer of glass in the optical stack, residing between the phosphor image-plane and the viewer, not shown. A seam exists between the image plane and the cover plate 90 in this design, which may be evident to the viewer. Seamless-design factors, however, are discussed in detail in patent application, Ser. No. 08/593,759. Such design factors are discussed hereinbelow for implementation in the special design case of FEDs.

Seams are located below the image plane. They are also visible, to a smaller degree, in both h-tiles and s-tiles. Although design requirements are thus less stringent, they are still important for making these seams invisible to the viewer.

An advantage of an h-tile-or an s-tile-approach is that the perimeters 72 of the tiles 74 do not require individual seals. Therefore, the major loss of space between pixels at the edge of adjacent h-tiles or s-tiles is due only to the space used for interconnection, as well as for tolerances of cutting h-tiles or s-tiles to appropriate dimensions. No allowance need be made for individual tile seals.

In the h-or s-tile approach, the narrow seal at the tile level may be eliminated, thus allowing for a much closer spacing of pixels, a higher line density and better lighting efficiency. In addition, connections at the edges for joining control and driver lines should be designed to occupy a minimal space. Thus, the 2×2 array of tiles will be connected on the outside edges of the tiles 74 and the FPD perimeter 72, as shown in FIG. 6.

As discussed in patent applications bearing Ser. Nos. 08/571,208 and 08/652,032, ledges may be eliminated for the 2×N array.

One possible design is to use the cover plate 90 and the backplate 92 of the FPD to apply a force to both the top plate 52" and the bottom plate 54 of the s-tile, or to both the bottom plate and the cover plate of an h-tile, with a captured, separable, pad-on-pad connector system, not shown. One such pad-on-pad connection system is described in co-pending patent application, Ser. No. 08/571,208, which describes a variety of contact systems for tiling. In the AMLCD arrangement 10 (FIG. 1), the gap 11 between the top plate 12 and the bottom plate 14 is only between 5-to-10 $\mu$m and is inconvenient for a pad-on-pad connector design, because the metal TAB thickness is generally at least 12 $\mu$m, while dendrite contact metallurgy adds another 10-to-20 $\mu$m. A special design was proposed to overcome this problem in the above-mentioned, co-pending patent application, Ser. No. 08/571,208.

For PFPDs and FEDs, the spacing between the top and bottom plates of h-and s-tiles is on the order of 25 $\mu$m, which is an ideal dimension for applying any of the various, pad-on-pad contact systems. A pad-on-pad design with a separable connector system is important for reworking a tiled display, if a defect is created during assembly. The vacuum and the clean assembly of FPDs makes them good candidates for highly reliable, advanced, separable, contact systems.

The problem of sealing may be defined in two parts, one pertaining to the bottom plate interconnections, the second for the top plate. The seal for the bottom plate includes a glass frame which is sealed to the backplate around the perimeter of the FPD. The seal material may be a low-melting glass frit; a low-temperature, sintered Solgel; a combination of these materials; or other suitable alternatives.

One alternative approach for an s-tiled FPD is shown in FIG. 14 and, for an h-tiled FPD, in FIG. 15. In these designs, a glass layer (or other non-permeable material) 98 is deposited on the backplate 100, so as to form a planarized, nonconductive layer 102 over electrical traces. This glass layer 98 is then selectively overlaid with a solderable metal system (e.g., chrome and copper) 104 and 104a. The cover plate 96 is processed in the same manner. A metallized, non-permeable spacer 106 is then soldered by using SnPb, SnIn or a similar material between the plates 96 and 100 around the total perimeter 72, thus forming a sealed enclosure 95.

FIG. 16 shows an alternative sealing design that is similar to the designs of FIGS. 14 and 15, except that electrical interconnections are fabricated as metal feed-throughs 150, having a coefficient of thermal expansion that is similar to glass, e.g., Invar™ or Kovar™, through the non-permeable spacer.

Figure 17:
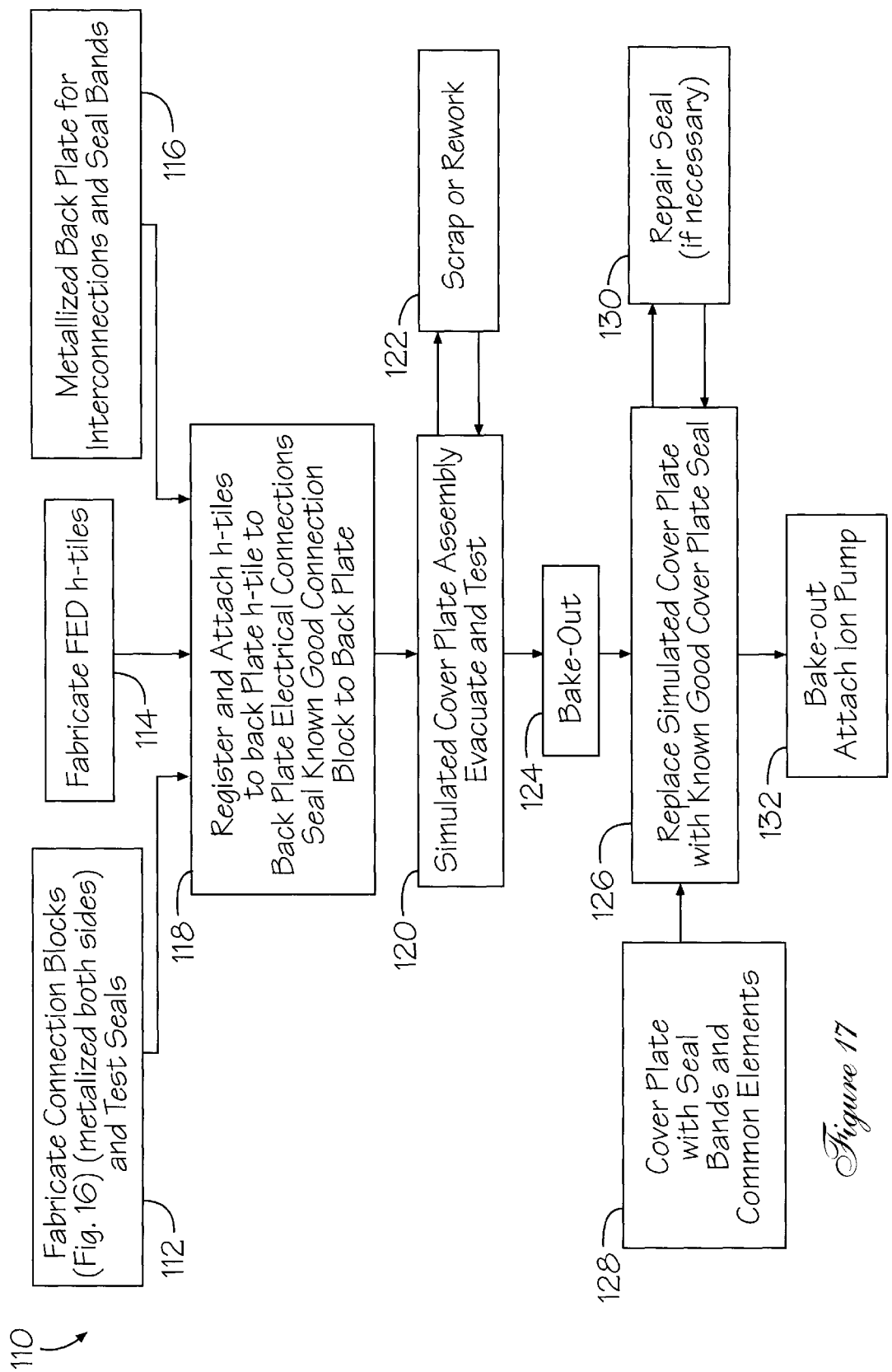
FIG. 17 shows a manufacturing flow for the h-tiled, FED process.

FIG. 17 is a flow chart of tile fabrication (h-tiles, in this example), shown generally as reference numeral 110. Connection blocks are fabricated and seals are tested, step 112. In this embodiment, FED h-tiles are also fabricated, step 114. The backplate is metallized for interconnections and seal bands, step 116. Next, h-tiles are registered and attached to the backplate's electrical connections, and known-good connection blocks are also sealed thereto, step 118. The simulated cover plate is then assembled, and the assembly is evacuated and tested, step 120. At this stage, the assembly, if defective, may be scrapped or reworked, in whole or in part, step 122. The assembly is baked, step 124. A cover plate having seal bands and common elements is fabricated, step 128. The simulated cover plate is replaced with this known-good cover plate and sealed, step 126. If necessary, the seal is repaired, step 130. The assembly goes through a final bake process, and the ion gauge is attached, step 132.

The ion pump previously mentioned also functions as an ion gauge. Because the vacuum requirements are very high for FED devices, it may be advantageous to permanently embody such a device in the design of an h-tiled or s-tiled FED. For superior reliability, this ion pump will enable the space between the cover plate and the backplate to reach the $10^{-8}$-to-$10^{-9}$ torr vacuum level. The ionic pump may be periodically activated throughout the life of the FPD to maintain a desired level of vacuum.

Although a manufacturing flow for the h-tiled, FED process has been described, other process flows may be used, as well, and variations of the process may be used for other h-tiled, FPD constructions.

In any of the tiled, s-tiled and h-tiled designs disclosed herein, electronic functions (such as drivers and control electronics) may be implemented in semiconductor devices mounted directly to the backplate. This is cost-effective, since fewer interconnections exit the seal.

For a large FPD with cover plates containing the phosphors and a conductive layer, e.g., ITO, it is important to maintain a uniformity of voltage across the screen. This is particularly the case with AMLCDs, where the field between the cover plate and the interconnection on the bottom plate determines the polarization and the optical transmission efficiency and, therefore, the color uniformity across the screen. In the tiled design, the dark space between pixels may be used for metal interconnections to supplement and enhance the conductivity in parallel with the ITO or other conductive material. FIG. 18 shows a typical arrangement of wiring for row driver lines 160 disposed on back plate 100 (FIG. 15). While only row driver lines 160 have been shown, it should be obvious that in alternate embodiments, column driver lines (not shown) could be placed on back plate 100.

Since other modifications and changes varied to fit particular operating requirements and environments will be apparent to those skilled in the art, the invention is not considered limited to the examples chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A sealed, flat-panel display having visually imperceptible seams, comprising:
    a) an optically transparent common back plate having a periphery;
    b) a mosaic of individual, unsealed transmissive AMLCD half-tiles (H-tiles) arranged adjacent one another with seams therebetween, each of said H-tiles comprising a substrate having front and rear faces, said rear faces being affixed to said optically transparent common back plate;
    c) a common cover plate having a periphery placed atop said mosaic of H-tiles forming a cavity between said front faces and said cover plate;
    d) spacer means between said front faces and said cover plate for maintaining a substantially uniform gap therebetween;
    e) a substantially non-permeable seal proximate said periphery of said cover plate and said optically transparent back plate for creating hermetic seals therebetween;
    f) liquid crystal material substantially filling said cavity; and
    g) electrical connection means operatively connected to each of said H-tiles and to said back plate.

2. The sealed, flat-panel display having visually imperceptible seams as recited in claim 1, wherein said optically transparent common back plate comprises a predefined pattern of electrical conductors operatively connected to said mosaic of H-tiles.

3. The sealed, flat-panel display having visually imperceptible seams as recited in claim 2, wherein said optically transparent predefined pattern of electrical conductors has a coefficient of thermal expansion (CTE) substantially equal to the CTE of said back plate.

4. The sealed, flat-panel display having visually imperceptible seams as recited in claim 3, wherein said predefined pattern of electrical conductors comprises al least one from the group of materials: Invar™ and Kovar™-type alloys.

5. The sealed, flat-panel display having visually imperceptible seams as recited in claim 1, wherein said substantially non-permeable seal comprises additional spacer means for maintaining a predetermined, substantially equal spacing between said cover plate and said optically transparent common back plate.

6. The sealed, flat-panel display having visually imperceptible seams as recited in claim 5, wherein said substantially non-permeable seal further comprises electrical feedthrough connection means operatively connected to said predefined pattern of electrical conductors.

7. The sealed, flat-panel display having visually imperceptible seams as recited in claim 1, wherein said H-tiles comprise known good tiles.

8. The sealed, flat-panel display having visually imperceptible seams as recited in claim 1, wherein said common face plate comprises a temporary common cover plate and said substantially permeable seam comprises a temporary seal, said temporary common cover plate and said temporary seal being used while testing said sealed flat-panel display.

9. The sealed, flat-panel display having visually imperceptible seams as recited in claim 1, wherein said optically transparent common cover plate and said common back plate comprise a substantially transparent material.

10. The sealed, flat-panel display having visually imperceptible seams as recited in claim 9, wherein said substantially transparent material comprises glass.

11. A method for assembling a sealed, flat-panel display having visually imperceptible seams, the steps comprising:
    a) providing a transparent, common back plate having a periphery and having a predetermined electrical conductor pattern disposed thereon;
    b) affixing the rear faces of a mosaic of individual, unsealed transmissive AMLCD half-tiles (H-tiles) to said common back plate;

c) electrically connecting said mosaic of H-tiles to said predetermined electrical conductor pattern;

d) placing a spacer means atop said mosaic of H-tiles;

e) placing a substantially impermeable perimeter spacer on said back plate proximate said perimeter;

f) placing a common cover plate having a periphery atop said spacer means and said impermeable perimeter spacer, thereby forming a cavity between said mosaic of H-tiles and said cover plate;

g) forming a substantially non-permeable seal proximate said peripheries of said cover and said back plates for creating a hermetic seal therebetween; and h) substantially filling said cavity with liquid crystal material.

12. The method for assembling a sealed, flat-panel display having visually imperceptible seams as recited in claim 11, wherein said predetermined electrical conductor pattern and said common back plate have substantially the same coefficients of thermal expansion.

13. The method for assembling a sealed, flat-panel display having visually imperceptible seams as recited in claim 11, wherein said substantially impermeable perimeter spacer, said common back plate and said common cover plate have substantially the same coefficients of thermal expansion.

14. The method for assembling a sealed, flat-panel display having visually imperceptible seams as recited in claim 11, wherein said mosaic of H-tiles comprises a mosaic of known good H-tiles.

15. The method for assembling a sealed, flat-panel display having visually imperceptible seams as recited in claim 11, wherein said spacer means atop said mosaic of H-tiles and said substantially impermeable perimeter spacer work cooperatively to maintain a substantially constant, predetermined space between said common back plate and said common cover plate.

16. The method for assembling a sealed, flat-panel display having visually imperceptible seams as recited in claim 11, wherein said common cover plate and said back plate comprise a transparent material.

17. The method for assembling a sealed, flat-panel display having visually imperceptible seams as recited in claim 16, wherein said transparent material comprises glass.

* * * * *